US012626247B2

(12) United States Patent
Singh et al.

(10) Patent No.: US 12,626,247 B2
(45) Date of Patent: May 12, 2026

(54) VOCAL SIGNATURE SYSTEMS AND METHODS

(71) Applicant: FMR LLC, Boston, MA (US)

(72) Inventors: Harmeet Singh, Brattleboro, MA (US); Kevin Johnson, Northborough, MA (US); Mark Muir, Dunstable, MA (US); Abhishek Kumar, Kissimmee, FL (US); Brian Autumn, Newton, MA (US)

(73) Assignee: FMR LLC, Boston, MA (US)

( * ) Notice: Subject to any disclaimer, the term of this patent is extended or adjusted under 35 U.S.C. 154(b) by 278 days.

(21) Appl. No.: 18/482,685

(22) Filed: Oct. 6, 2023

(65) Prior Publication Data

US 2024/0112180 A1 Apr. 4, 2024

Related U.S. Application Data

(63) Continuation-in-part of application No. 17/376,678, filed on Jul. 15, 2021, now abandoned.

(51) Int. Cl.
| | |
|---|---|
| *G06Q 20/38* | (2012.01) |
| *G06F 40/174* | (2020.01) |
| *G06Q 20/40* | (2012.01) |

(52) U.S. Cl.
CPC ....... *G06Q 20/3825* (2013.01); *G06F 40/174* (2020.01); *G06Q 20/389* (2013.01); *G06Q 20/40145* (2013.01)

(58) Field of Classification Search
CPC .............. G06Q 30/0185; G06Q 30/016; G10L 15/26; G10L 17/24

(Continued)

(56) References Cited

U.S. PATENT DOCUMENTS

| | | | |
|---|---|---|---|
| 9,742,781 B1 | 8/2017 | Saylor et al. | |
| 2003/0135740 A1* | 7/2003 | Talmor .................. | H04L 9/3231 713/186 |

(Continued)

FOREIGN PATENT DOCUMENTS

WO WO 2015-048533 A1 4/2015

OTHER PUBLICATIONS

F. Iffath et al., "A Novel Three Stage Framework for Person Identification From Audio Aesthetic," IEEE Access, vol. 10, pp. 90229-90243, Aug. 18, 2022, retrieved from https://ieeexplore.ieee.org/stamp/stamp.jsp?arnumber=9862985 (Year: 2022).*

*Primary Examiner* — Jessica Lemieux
*Assistant Examiner* — Joshua D Schneider
(74) *Attorney, Agent, or Firm* — Cesari and McKenna, LLP

(57) ABSTRACT

A computerized method is provided for digitally signing a digital document related to a transaction request from a customer. The method includes receiving, by a computing device, data related to the transaction request from the customer via a web-based interface. Receipt of the transaction data initiates a request session. The method also includes recording during the request session a voice signature sample from the customer via the web-based user interface and verifying the customer for the transaction request by comparing the voice signature sample with a stored voice print of the customer. Further, a consolidated record for the transaction request is generated that includes the transaction data and the transaction result. The digital document is populated with the transaction data if the customer is verified, where the digital document is treated as being digitally signed by the customer.

17 Claims, 13 Drawing Sheets

(58) Field of Classification Search
USPC ......................................................... 705/304
See application file for complete search history.

(56) References Cited

U.S. PATENT DOCUMENTS

| | | | |
|---|---|---|---|
| 2004/0102959 A1* | 5/2004 | Estrin | G06F 21/64 |
| | | | 704/8 |
| 2013/0085941 A1 | 4/2013 | Rosenblatt et al. | |
| 2016/0132693 A1* | 5/2016 | Kumar | G06F 21/16 |
| | | | 726/28 |
| 2017/0270530 A1* | 9/2017 | Sheets | G10L 17/22 |
| 2018/0101511 A1* | 4/2018 | Allen | G06K 19/06037 |
| 2020/0097972 A1* | 3/2020 | Karnik | G06Q 20/4014 |
| 2022/0147970 A1* | 5/2022 | Babcock | G06Q 20/4016 |

* cited by examiner

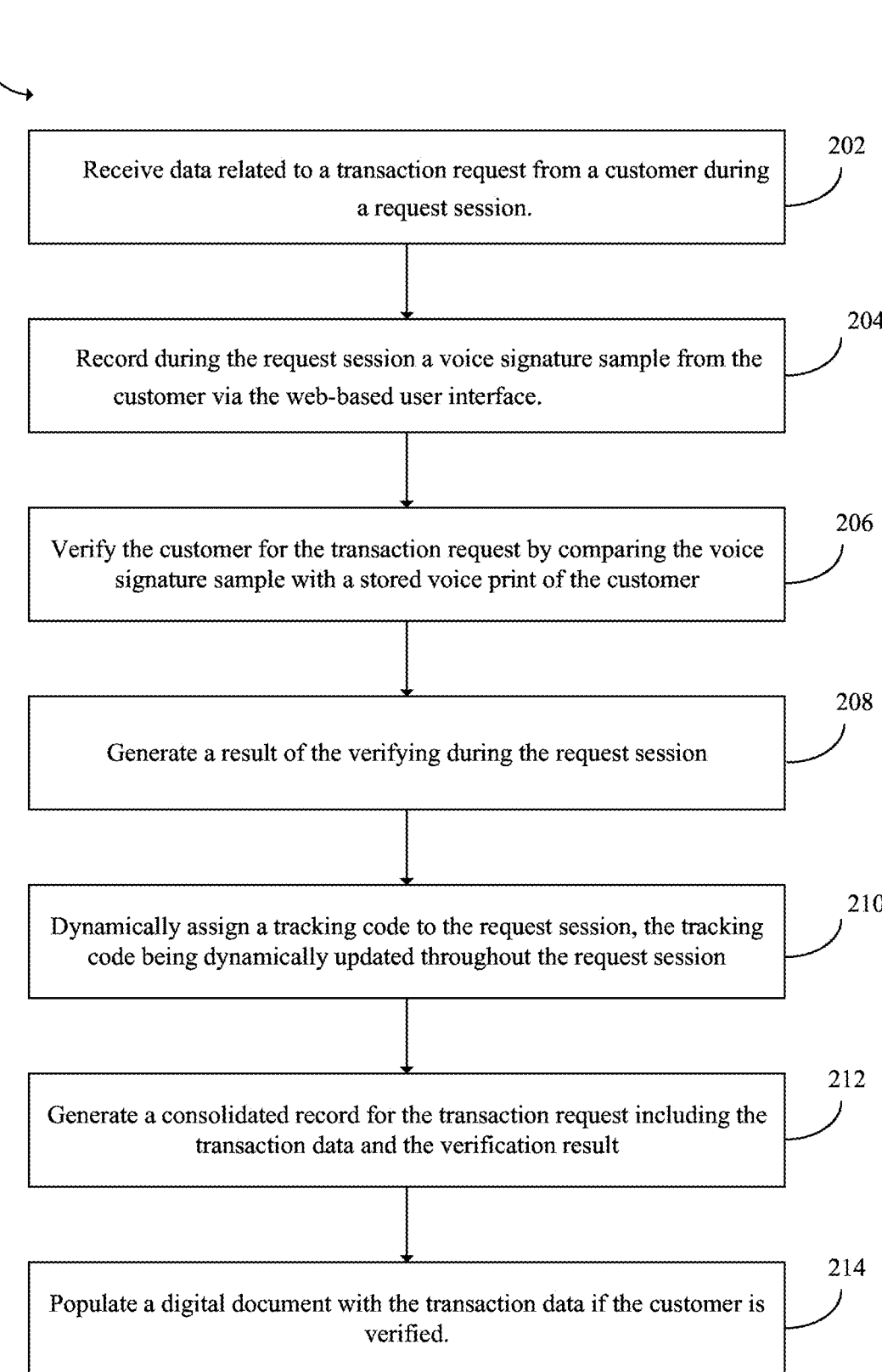

*200*

Receive data related to a transaction request from a customer during a request session.    *202*

Record during the request session a voice signature sample from the customer via the web-based user interface.    *204*

Verify the customer for the transaction request by comparing the voice signature sample with a stored voice print of the customer    *206*

Generate a result of the verifying during the request session    *208*

Dynamically assign a tracking code to the request session, the tracking code being dynamically updated throughout the request session    *210*

Generate a consolidated record for the transaction request including the transaction data and the verification result    *212*

Populate a digital document with the transaction data if the customer is verified.    *214*

FIG. 2

Address Change

Use this form to update the address or phone of an owner or authorized individual. Type on screen or fill in using CAPITAL letters and black ink. If you need more room for check requests, make a copy of the relevant page.

Helpful To Know

- You must already be an owner or an authorized individual (trustee, custodian, etc.) in order to change an address on an account.
- If your statements show accounts of other owners, ALL of those owners must sign this form. To "unbundle" a statement group, contact Fidelity.

- You can change your address at Fidelity.com/address and your combined statement address at Fidelity.com/statement.
- To change your address on employer-sponsored accounts, call your plan sponsor or go to Netbenefits.fidelity.com.
- To request duplicate statements, or to change the address for them, you must complete the Duplicate Statements Request form.

500

1. Account Owner(s)

*Louisiana Residents:*
*Consult a legal or tax professional before changing address on joint accounts.*

Name
Mark Mxxx

Additional Owner/Authorized Individual Name

2. Accounts Involved    *Change of address will be applied only to the account(s) indicated.*

☐ ALL accounts associated with:

Social Security or Taxpayer ID Number

Social Security or Taxpayer ID Number

☐ Do NOT update any Fidelity life insurance contracts.

*If you check this box, the address will remain unchanged on any accounts you do not identify here.*

☐ ONLY on these accounts:

Account Number

Account Number

Account Number

Account Number

Account Number

Account Number

Account Number

Account Number

Account Number

☐ Do NOT update any Fidelity life insurance contracts.

3. New Address of Owner(s)

Legal/Residential Address  *This is your legal address used for tax reporting.*

Address
24 Winter Street

| City | State/Province | ZIP/Postal Code | Country |
|------|----------------|-----------------|---------|
| Boston | MA | 01201 | |

Daytime Phone

Extension

Mailing Address  *This may be a PO Box, drop box, or c/o location.*

☐ Same as legal/residential address

Address

| City | State/Province | ZIP/Postal Code | Country |
|------|----------------|-----------------|---------|

FIG. 5

Form continues on next page. ≫ ≫

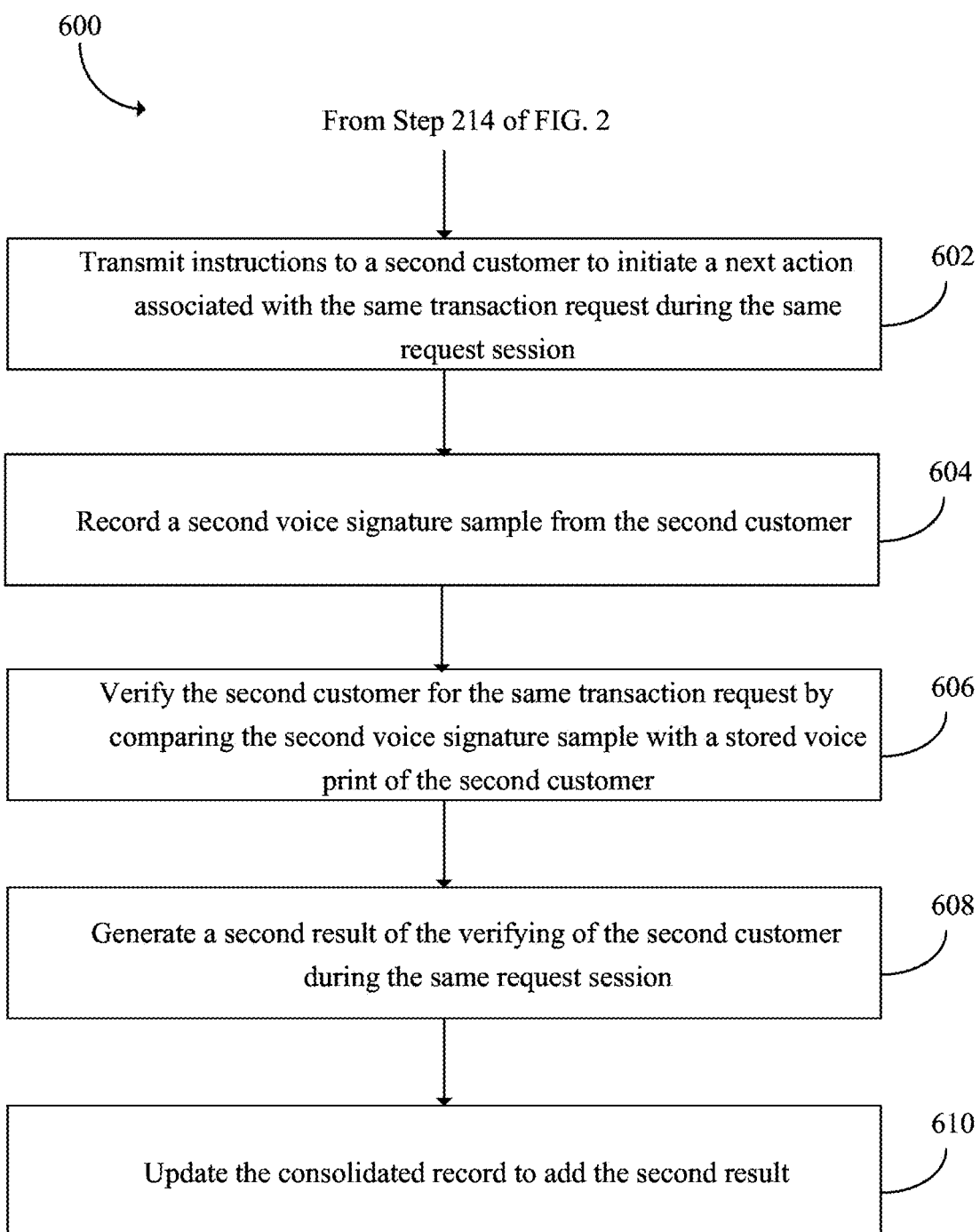

600

From Step 214 of FIG. 2

Transmit instructions to a second customer to initiate a next action associated with the same transaction request during the same request session    602

Record a second voice signature sample from the second customer    604

Verify the second customer for the same transaction request by comparing the second voice signature sample with a stored voice print of the second customer    606

Generate a second result of the verifying of the second customer during the same request session    608

Update the consolidated record to add the second result    610

FIG. 6

Vocal Signature Encryption Process

VOCAL SIGNATURE SYSTEMS AND METHODS

CROSS REFERENCE TO RELATED APPLICATIONS

This application is a continuation-in-part of U.S. application Ser. No. 17/376,678, filed on Jul. 15, 2021 and entitled "Vocal Signature Systems and Methods", the content of which is incorporated herein by reference in its entirety.

TECHNICAL FIELD

This application relates generally to systems, methods and apparatuses, including computer program products, for vocal signature of digital documents related to online transaction requests.

BACKGROUND

Traditional processes for signing documents are accomplished either on paper or digitally, followed by "Sign First Verify Later" standards with no context of the transactions involved. Currently, these signature processes also do not provide fraud detection or have a signature expiration process.

SUMMARY

To remedy the shortcomings in today's market, the present invention provides a solution where a customer can use his or her voice to generate a paperless, touch-free, and seamless voice-based signature following a 'Verify First Sign Later' standard. Multiple parties, witnesses, joint account holders can also simultaneously sign using their voices. The present invention features systems and methods for vocally completing and signing documents for a paperless and touch-free experience. The present systems and methods can be used to track and confirm ownership of an online stop-and-go digital document signature process, such as a multi-step form and account opening process. For example, a tracking code (e.g., a Quick Response (QR) code) can be assigned to an ongoing document signature process and shared with a business associate online or in branch to retrieve a record for subsequent completion, thereby providing an end-to-end paperless experience. In some embodiments, the present digital document signature systems and methods allow retrieval of a record that captures the full context of the signature process using the information vocally provided. In some embodiments, the present digital document signature systems and methods can combine customer voice verification with associate voice verification for a witness-based vocal signature process (i.e., an associate can use his or her enrolled voice to sign as a witness).

In one aspect, the present application features a computer-implemented method for digitally signing a digital document related to a transaction request from a customer. The computerized method comprises receiving, by a computing device, data related to the transaction request from the customer via a web-based interface. Receipt of the transaction data initiates a request session. The method includes recording, by the computing device, during the request session a voice signature sample from the customer via the web-based user interface, and verifying, by the computing device, the customer for the transaction request by comparing the voice signature sample with a stored voice print of the customer. The method also includes generating, by the computing device, a result of the verifying step during the request session, generating, by the computing device, a consolidated record for the transaction request including the transaction data and the result, and dynamically assigning, by the computing device, a tracking code to the request session, the tracking code being dynamically updated throughout the request session to capture at least the transaction data and the result of the verifying step. The method further includes populating, by the computing device, the digital document with the transaction data if the customer is verified, where the document is treated as being digitally signed by the customer.

In another aspect, the invention features a computer-implemented system for digitally signing a digital document related to a transaction request from a customer. The computerized system comprises a web-based interface application configured to (i) receive data related to the transaction from the customer, (ii) initiate a request session based on the receipt of the transaction data, and (iii) record, during the request session, a voice signature sample from the customer. The computerized system also includes a verification platform configured to (i) verify the customer for the transaction request by comparing the voice signature sample with a stored voice print of the customer, and (ii) generate a result of the verification during the request session. The computerized system further includes a processing system configured to generate a consolidated record for the transaction request including the transaction data and the result, dynamically assign a tracking code to the request session, the tracking code being dynamically updated throughout the request session to capture at least the transaction data and the result of the verification, and populate the digital document with the transaction data if the customer is verified, where the digital document is treated as being digitally signed by the customer.

Any of the above aspects can include one or more of the following features. In some embodiments, the customer is notified of the result of the verification by displaying a confirmation code on the web-based interface.

In some embodiments, instructions are provided regarding what the customer should utter in the voice signature sample. In some embodiments, the voice signature sample includes a vocal description of the transaction requested. In some embodiments, verifying the customer for the transaction comprises ensuring (i) the voice signature sample matches the stored voice print of the customer, and (2) details about the transaction request match the vocal description of the transaction. In some embodiments, comparing the voice signature sample with the stored voice print of the customer comprises converting the voice signature sample to a text string and comparing the text string with a text representation of the stored voice print.

In some embodiments, the tracking code is a Quick Response (QR) code. In some embodiments, the tracking code is used to retrieve information about the transaction request stored in the consolidated record. In some embodiments, the tracking code captures a time stamp associated with the request session, and signing of the digital document by the customer needs to be completed in a predetermined time period from the time stamp.

In some embodiments, instructions are transmitted to a second customer to initiate a next action associated with the same transaction request during the same request session. A second voice signature sample from the second customer is recorded. The second customer is verified for the same transaction request by comparing the second voice signature sample with a stored voice print of the second customer. A second result of the verification of the second customer during the same request session. The consolidated record is updated to add the second result. In some embodiments, the second customer is visually notified of the result of the verification. If the second customer is verified after the verification of the first customer, the digital document is treated as being signed by both the first and second customers. The request session is then terminated. In some embodiments, the consolidated record for the request session includes data related to both the first and second customers. In some embodiments, the first and second customers are in geographically separate locations.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 2 shows a process diagram of an exemplary computerized method for vocally signing a digital document utilizing the computing system and resources of FIG. 1, according to some embodiments of the present invention.

FIG. 5 shows an exemplary address change form created based on the data collected and generated from the web-based interface of FIGS. 3 and 4, according to some embodiments of the present invention.

FIG. 6 shows a process diagram of an exemplary computerized method for vocally signing the same digital document from the method of FIG. 2 by a second customer, according to some embodiments of the present invention.

DETAILED DESCRIPTION

Figure 1:
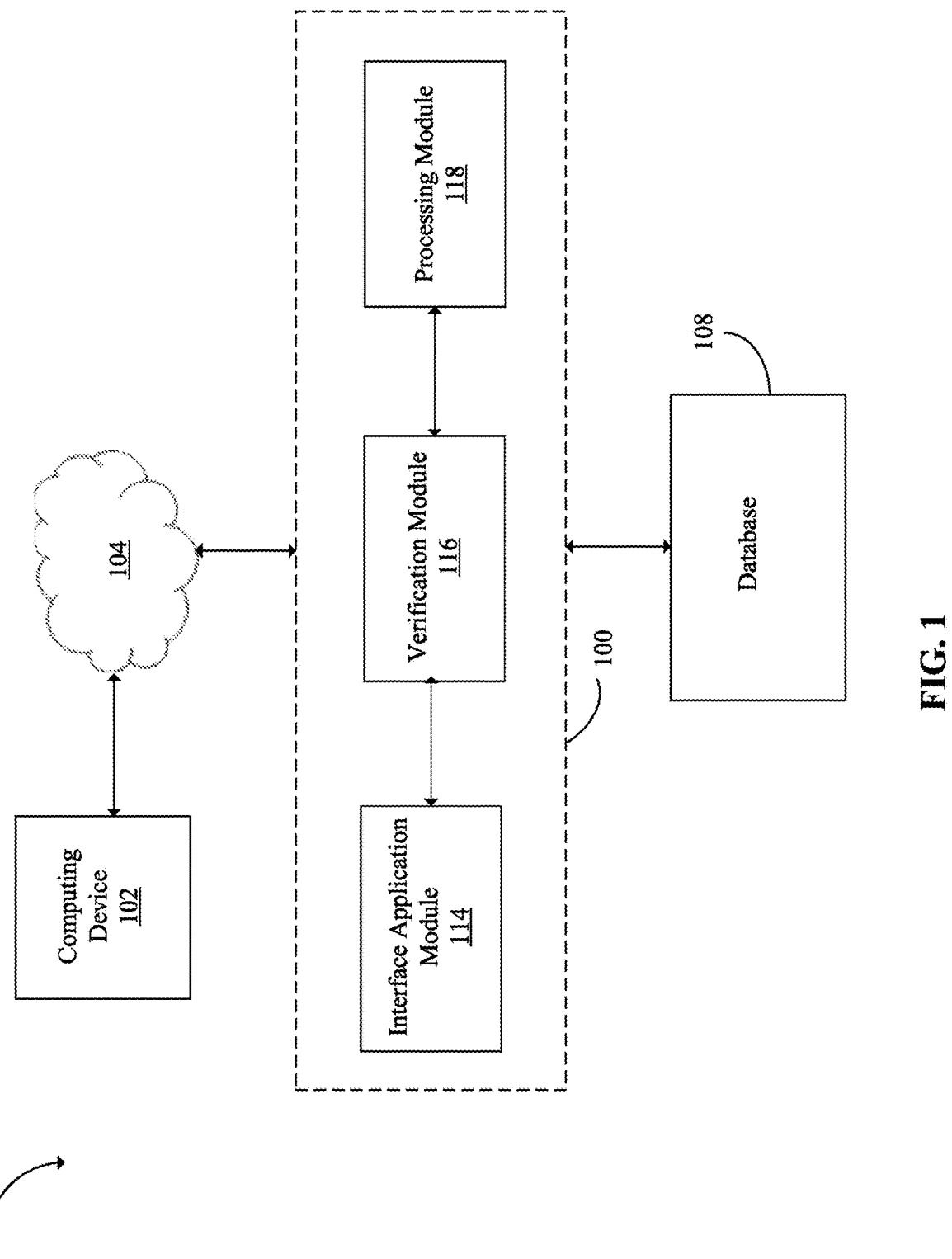
FIG. 1 shows an exemplary diagram of a vocal signature engine used in a computing system for vocally signing digital documents, according to some embodiments of the present invention.

FIG. 1 shows an exemplary diagram of a vocal signature engine 100 used in a computing system 101 for vocally signing digital documents, according to some embodiments of the present invention. As shown, the computing system 101 generally includes at least one client computing device 102, a communication network 104, the vocal signature engine 100, and one or more databases 108.

The client computing device 102 connects to the communication network 104 to communicate with the vocal signature engine 100 and/or the database 108 to provide inputs and receive outputs relating to the process of vocally signing a digital document as described herein. For example, the computing device 102 can provide a detailed graphical user interface (GUI) that allows a user to input transaction data and voice samples and display instructions and results using the analysis methods and systems described herein. Exemplary computing devices 102 include, but are not limited to, telephones, desktop computers, laptop computers, tablets, mobile devices, smartphones, and internet appliances. In some embodiments, the computing device 102 has voice playback and recording capabilities. It should be appreciated that other types of computing devices that are capable of connecting to the components of the computing system 101 can be used without departing from the scope of invention. Although FIG. 1 depicts a single computing device 102, it should be appreciated that the computing system 101 can include any number of client devices. As an example, if a transaction is based on a multi-step, stop-and-go process, any number of devices described above can be used to complete the process. For instance, if the process started on a laptop, it can be completed on any other devices, such as on one or more mobile phones.

The communication network 104 enables components of the computing system 101 to communicate with each other to perform the process of vocal signature of digital documents. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The vocal signature engine 100 is a combination of hardware, including one or more processors and one or more physical memory modules and specialized software engines that execute on the processor of the vocal signature engine 100, to receive data from other components of the computing system 101, transmit data to other components of the computing system 101, and perform functions as described herein. As shown, the processor of the data validation engine 100 executes an interface application module 114, a verification module 116, and a backend processing module 118. These sub-components and their functionalities are described below in detail. In some embodiments, the various components of the vocal signature engine 100 are specialized sets of computer software instructions programmed onto a dedicated processor in the vocal signature engine 100 and can include specifically-designated memory locations and/or registers for executing the specialized computer software instructions.

The database 108 is a computing device (or in some embodiments, a set of computing devices) that is coupled to and in communication with the vocal signature engine 100 and is configured to provide, receive and store various types of data received and/or created for performing voice signature of digital documents, as described below in detail. In some embodiments, all or a portion of the database 108 is integrated with the vocal signature engine 100 or located on a separate computing device or devices. For example, the database 108 can comprise one or more databases, such as MySQL™ available from Oracle Corp. of Redwood City, California.

FIG. 2 shows a process diagram of an exemplary computerized method 200 for vocally signing a digital document utilizing the computing system 101 and resources of FIG. 1, according to some embodiments of the present invention. The method 200 starts with the interface application module 114 of the vocal signature engine 100 receiving data related to signing a document for a transaction request that is made by a customer via the customer's computing device 102 (step 202). For example, the customer can supply the data from a web-based user interface generated by the interface application module 114 and displayed on the customer's computing device 102. In some embodiments, the web-based user interface is initiated by the customer via a vendor website to start the desired transaction request. The vocal signature engine 100 is configured to initiate a request session associated with the transaction request after the receipt of the transaction data. In some embodiments, the interface application module 114 dynamically generates a tracking code for the request session as soon as it is initiated, where the tracking code dynamically captures data as it is being entered by the customer and/or generated by the vocal signature engine 100 throughout the request session. The tracking code can be in the form of a Quick Response (QR) code, for example. A person of ordinary skill in the art understands that any similar electronic tracking code can be used without departing from the scope of the present invention. Optionally, the tracking code can capture a time stamp associated with the start of the request session which can be subsequently used to determine the expiration of a predetermined time period during which the customer must complete the document signing process.

Figure 3:
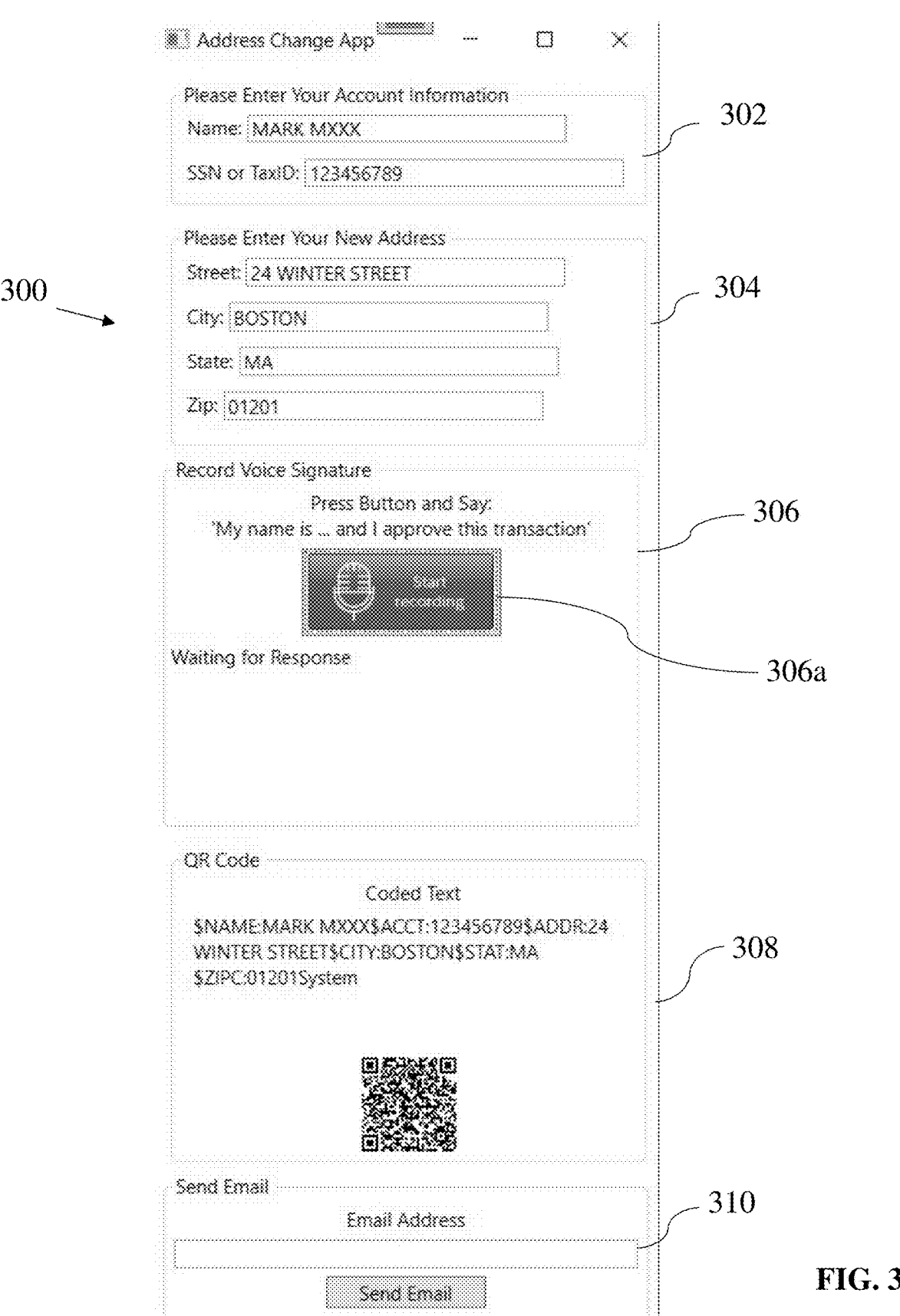
FIG. 3 shows an exemplary web-based interface provided by the interface application module of the vocal signature engine of FIG. 1 for responding to an address-change request from a customer using the computerized method 200 of FIG. 2, according to some embodiments of the present invention.

FIG. 3 shows an exemplary web-based user interface 300 generated by the interface application module 114 of the vocal signature engine 100 of FIG. 1 for responding to an address-change request from a customer using the computerized method 200 of FIG. 2, according to some embodiments of the present invention. As shown, the user interface 300 includes a number of data fields that prompt the customer for information related to his or her address change request. For example, fields in area 302 ask the customer to enter his or her account information, such as name, social security number and/or account number. Field area 304 asks the customer to enter his or her new address to which the current account address is changed. The field area 304 can be different to solicit information for different types of transaction request desired by the customer. In some embodiments, as information is entered by the customer via the field areas 302, 304, a dynamic tracking code (e.g., a QR code) is generated and displayed in the tracking code area 308. For example, the QR code can be dynamically updated in real-time or near real-time to capture the account data and the new address information supplied by the customer in the field areas 302, 304, respectively, as the data is entered by the customer.

Referring to FIG. 2, the interface application module 114 is also configured to request the customer to record a voice signature sample for submission via the user interface (step 204). The purpose for this request is to verify the identity of the customer and/or the content of the request in a paperless manner prior to permitting signature of any electronic document associated with the request. In some embodiments, the user interface can provide written instructions to the customer for generating the voice sample, such as how to record the voice sample via the user interface and what the customer should utter in the voice recording. For example, the user interface can instruct the customer to provide a vocal description of the transaction requested.

As shown in FIG. 3, the user interface 300 includes a voice signature recording area 306, in which instructions for recording the customer's voice sample is displayed. For example, the recording area 306 can include written instructions to the customer to press a "start recording" button 306a and utter "My name is _ and I approve the transaction." Upon the customer releasing the button 306a, the customer's utterance is recorded by the interface application module 114.

Referring to FIG. 2, after the receipt of the voice sample recording by the vocal signature engine 100 (step 204), the interface application module 114 is adapted to transmit the sample to the verification module 116 of the vocal signature engine 100 for verifying the customer associated with the transaction request (step 206). In some embodiments, such verification by the verification module 116 involves comparing the recorded voice sample (from step 204) with a stored voice print of the customer to confirm that there is a vocal match. This vocal match comparison can be accomplished using any existing technology, such as a deep learning neural network. The customer's voice print can be generated from a previous transaction and stored in the database 108 of the computing system 101. Further, the current voice sample can be stored in the database 108 for future reference. In some embodiments, the verification module 116 further requires that details about the transaction request match the vocal description of the transaction in the voice sample. The verification module 116 can accomplish this by converting the voice sample to one or more text strings and using natural language processing to compare the converted text string(s) with the stored customer data in text form (e.g., the data entered in field area 302 and/or field area 304 of FIG. 3).

The verification module 116 is configured to generate a verification result based on determining whether one or both types of comparisons (i.e., vocal and/or content match) are successful (step 208). For example, the verification result can include an indication of whether the customer is verified or not verified, as well as a token referencing the vocal sample. The verification module 116 can convey this result to the interface application module 114. In response to receiving the verification result from the verification module 116, the interface application module 114 is configured to dynamically update the tracking code to capture the verification result and, optionally, assign a session ID to the transaction request (step 210). Further, the interface application module 114 can transmit an array of data generated up to this point for the transaction request to the processing module 118 for creating a consolidated record associated with the transaction request (step 212). The data transmitted to the processing module 118 can include data received from the customer (e.g., the transaction data), data received from the verification module 116 (e.g., the verification result that includes the voice signature token), as well the data generated by the interface application module 114 itself (e.g., the up-to-date tracking code). In some embodiments, the processing module 118 stores the consolidated record for the request session in the database 108 of the computing system 101. The processing module 118 is also configured to generate a confirmation code that is transmitted to the interface application module 114, and the interface application module 114 in turn updates the user interface to display the confirmation code that visually notifies the customer of the verification result. In some embodiments, if the interface application module 114 determines that a time period measured from the beginning of the request session (as recorded by the tracking code) has expired before the verification process is completed, the application module 114 can display a suitable message to the customer and terminate the request session without permitting the requested vocal signature.

Figure 4:
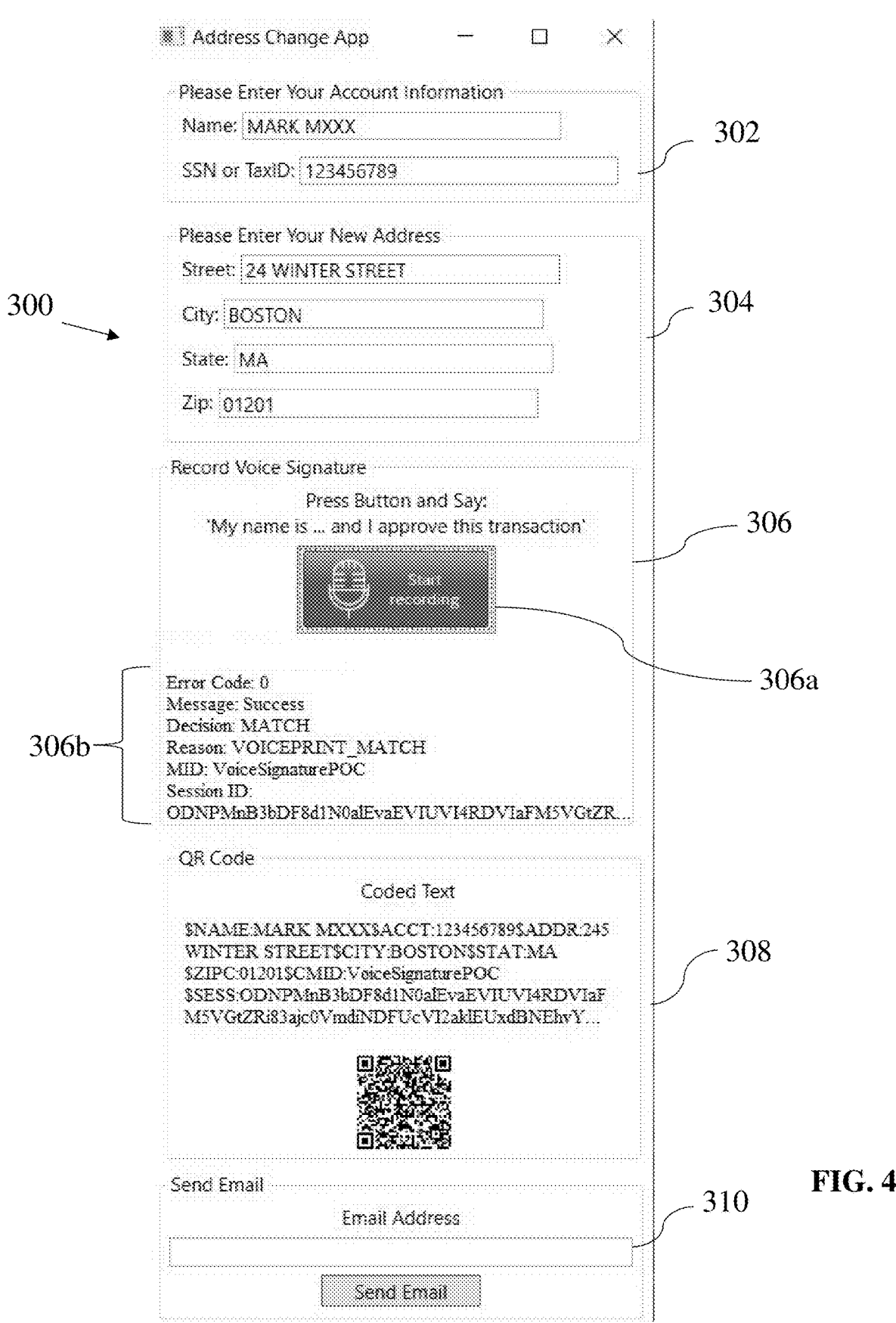
FIG. 4 shows the exemplary web-based interface of FIG. 3 updated to visually notify a customer of the verification result associated with the address change request, according to some embodiments of the present invention.

FIG. 4 shows the exemplary web-based interface 300 of FIG. 3 updated to visually notify a customer of the verification result associated with the address change request, according to some embodiments of the present invention. As shown, in the voice signature recording area 306, region 306b displays the confirmation code (generated by the processing module 118 at step 212) conveying to the customer that voice and/or content match is successful and the customer is verified. The confirmation code can include different types of data related to the verification, such as an error code, a success/fail message, a match/mismatch decision, a reason for the decision, the token referencing the voice sample, and a session ID. Further, in the tracking code area 308 the QR code generated from the previous activities is augmented in real-time or near real-time to capture the verification outcome, including the session ID and the voice signature token. If the verification module 116 found a mismatch and the customer is not verified, the confirmation code and the QR code are suitably configured to display the negative result. In some embodiments, the web-based interface 300 can further display a message to the customer regarding the transaction request, such as "your address change has been processed." In some embodiments, if the customer enters an email address via the field 310 of the interface 300, the interface application module 114 is configured to email the QR code and a copy of the transaction data to the customer at the address provided.

Referring to FIG. 2, the vocal signature engine 100 is further configured to populate a digital document with the transaction data supplied by the customer if the customer is verified (step 214). The digital document is thus considered as being digitally signed by the customer. In some embodiments, the vocal signature engine 100 emails the populated form to the customer using the email address supplied, such as supplied via the field 310 of the interface 300 of FIG. 3. FIG. 5 shows an exemplary address change form 500 created based on the data collected and generated from the web-based interface 300 of FIGS. 3 and 4, according to some embodiments of the present invention. As shown, the appropriate fields of the form 500 are populated with the information entered by the customer in fields 302, 304 of the interface 300. In addition, the up-to-date QR code in the tracking code area 308 of the interface 300 is attached to the form 500 so that the code can be used by a vendor to retrieve any relevant information about the change-of-address request. In general, this tracking code provides a fast and efficient means for retrieving information about a transaction request associated with a voice signature process, where the information is stored in the database 108 of the computing system 101 as a part of the consolidated record created for the transaction request (from step 212). For example, if a customer subsequently has a question about a transaction, the customer can go to a local branch and show a customer service representative the QR code (either on a physical form or via an electronic device). The representative can read the QR code to access information directly related to the transaction in question.

Figure 7:
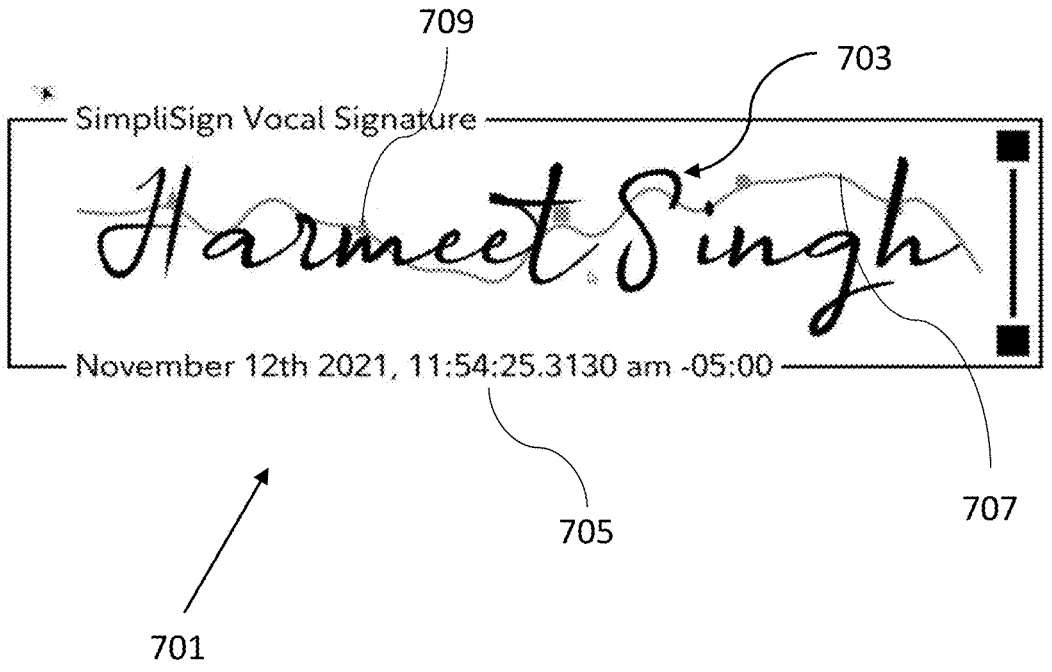
FIG. 7 shows an exemplary physical signature incorporating vocal signature and other attributes according to certain embodiments.

In certain embodiments, the tracking code may include a physical signature comprising the customer's name instead of or in addition to the QR code. An exemplary, tracking code 701 comprising a physical signature 703 is shown in FIG. 7. In various embodiments, the physical signature 703 may be uniquely depicted for each customer. For example, to differentiate amongst people with the same name (e.g. John Smith), the font used to depict the name of the signatory may be altered for each signature in such a way so that each John Smith has an ever-so-slightly different version of the font. The differences in font may be visibly detectable to the human eye or may be so slight as to require computer detection. The physical signature can include data, including transaction data, that ties together the vocal signature recording, the context of the transaction being signed, and the unique identifier of the signatory. In some embodiments, the tracking code 701 may comprise a visual waveform representation 707 of the signatory's vocal signature for this transaction such as the voice signature sample. The tracking code 701 may further include transactional information such as a time stamp 705 and/or other information represented alphanumerically.

In some embodiments, the tracking code 701 may include additional visual representations of transaction data including transactional context information. For example, one or more symbols 709 may be depicted along the waveform wherein the location along the waveform and/or the shape (e.g. squares, circles, triangles), size, or other characteristic of the symbol may signify the context of the transaction being signed. For example, a 30% withdrawal may be identified by a downward-pointed triangle located 30% of the way along the waveform. Accordingly, transactional information could be visually deciphered by a computer using only the tracking code 701 without relying on a transaction identifier number or reference to a transaction database.

In addition to permitting vocal signature by a single signing party, the present invention also supports vocal signature by multiple signing parties with respect to a single transaction request. FIG. 6 shows a process diagram of an exemplary computerized method 600 for vocally signing the same digital document from the method of FIG. 2 by a second customer, according to some embodiments of the present invention. In this case, the request session for a transaction request is kept open by the vocal signature engine 100 after completing the vocal signature of the digital document by the first customer (i.e., after step 214 of FIG. 2). Further, the vocal signature engine 100 is configured to transmit instructions to a second customer via a computing device registered to the second customer to initiate the next action required to sign the same document by the second customer for the same transaction request (step 602). The vocal signal engine 100 can record a voice sample of the second customer in the same manner as that for the first customer using the procedure described above with references to step 204 of the method 200 of FIG. 2 (step 604). Recording and transmitting the voice sample of the second customer can be performed using the computing device of the second customer.

The vocal signal engine 100 can then verify the second customer in the same manner as that for the first customer using the procedure described above with references to step 206 of the method 200 of FIG. 2 (step 606). For example, the verification module 116 can verify the second customer based on (i) comparing the voice sample of the second customer with a stored voice print of the same customer and/or (ii) comparing the content of the voice sample of the second customer with the transaction data collected from the first customer describing the transaction request (e.g., via fields 302 and 304 of the interface 300 of FIG. 3). The verification module 116 can generate a verification result for the second customer based on determining whether one or both types of comparisons (i.e., vocal and/or content match) are successful, same as the procedure described above with reference to step 208 of method 200 for generating the verification result for the first customer (step 608). For example, the verification result can include an indication of whether the second customer is verified or not verified, as well as a token referencing the vocal sample of the second customer. The verification module 116 can convey this result to the interface application module 114. In response to receiving the verification result from the verification module 116, the interface application module 114 is configured to dynamically update the tracking code to capture the verification result of the second customer. Further, the interface application module 114 can transmit data related to the second customer to the processing module 118 so that the processing module 118 can augment the consolidate data created for the request session with the data of the second customer (step 610). The data transmitted can include the verification result of the second customer as well as the updated tracking code. Thus, the consolidated record includes data related to both the first and second customers with respect to the same transaction request.

In some embodiments, the second customer is notified of the verification result via the computing device of the second customer. In some embodiments, the first customer is notified of the verification result of the second customer via the computing device of the first customer. If the second customer is verified after the verification of the first customer, the digital document associated with the request session is considered to be signed by both the first and second customers. In some embodiments, the document is required to be signed by only the first and second customers, in which case the request session is terminated by the vocal signature engine 100 after method 600 is performed. Otherwise, method 600 is repeated with each additional signing party until all parties are verified. In some embodiments, the first and second customers (and any additional signing parties) are located at geographically separate locations. Thus, the present invention provides an efficient way for document signature by multiple parties without requiring their in-person attendance at a local branch or circulation of a physical document form among the parties. In some embodiments, at least one of the signing parties is a customer service representative, and customer voice verification is combined with representative voice verification for a witness-based vocal signature process (i.e., the representative can use his or her enrolled voice to sign as a witness). In some embodiments, all the singing parties are joint account holders in relation to the transaction request. In some embodiments, the verification/signature of all parties need to be completed within a predetermined time limit measured from the initiation of the request session (as tracked by the QR code).

In some embodiments, the methods and systems described herein incorporate fraud checking detection based on multiple sources of information. For example, a customer's voice signal can be compared against a list of voices in a fraud list to detect any noticeable abnormalities in the voice signal and its transcription. A validation can also be performed against metadata of a transaction to detect any fraudulent activities.

In general, the present invention is advantageous over traditional signature processes that follow the sign-first-verify-later model. Instead, the present invention focuses on providing a verify-first-sign-later experience. The present invention enhances customer security by providing transaction-level approvals in addition to any traditional user ID and password requirement for signing into a vendor platform. Further, the present invention facilitates faster agent-customer interactions because a customer no longer needs to wait for a physical form to be printed, completed and signed. Thus, the present invention provides a pathway for elimination of paper forms in general. Other advantages of the present invention include (i) allowing customers to save and complete document signature anywhere, thus facilitating the signature process for paperless, on-the-go customers, (ii) representing digital voice in a tracking code for easy access and share, and (iii) providing context based vocal signature that captures and embeds multi-level information in relation to the document being signed and the transaction requested.

Figure 8:
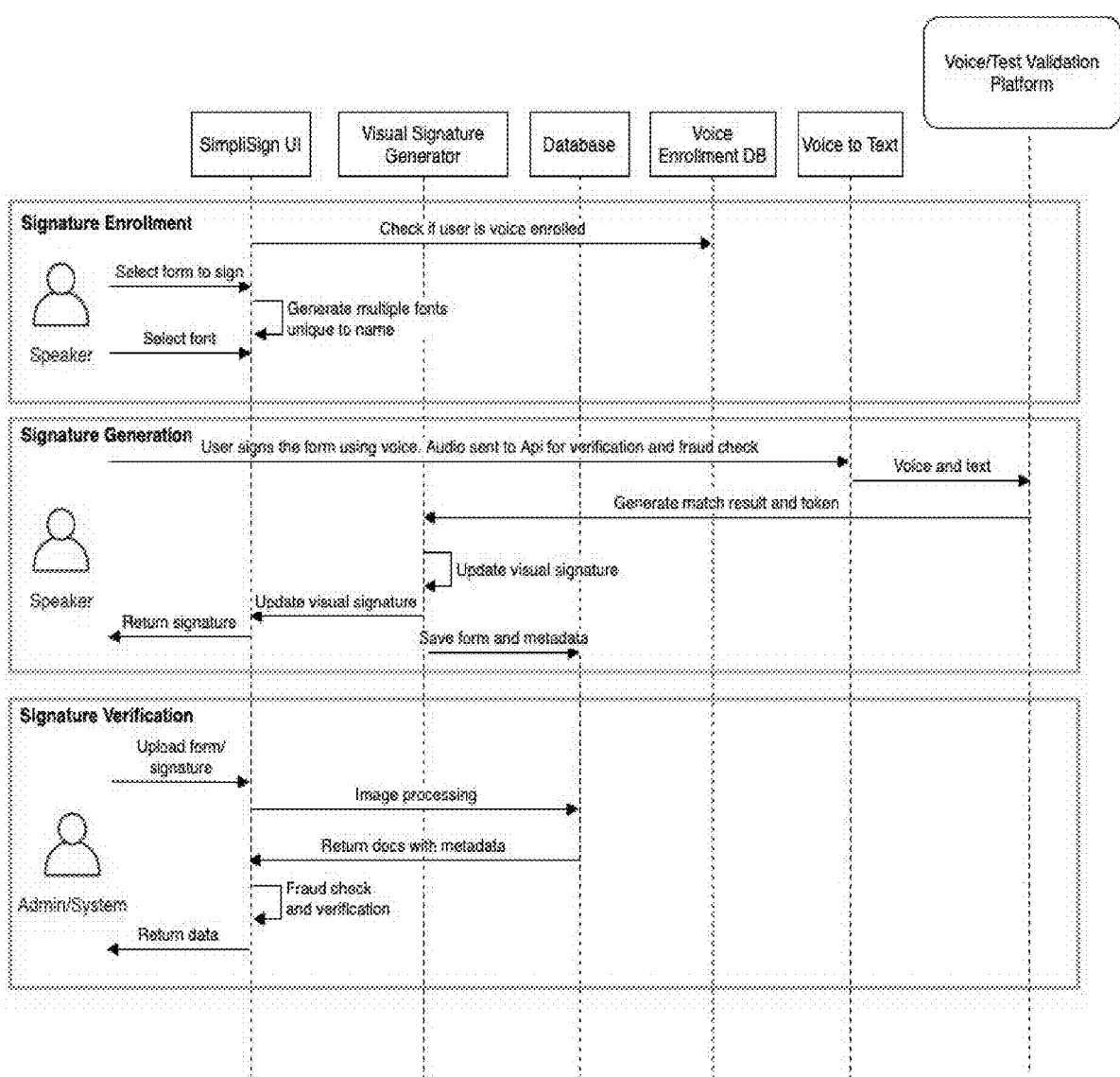
FIG. 8 shows a three-step flow diagram for vocal signature enrollment, generation, and verification according to certain embodiments.

Vocal signature implementation may be represented by the three steps depicted in the flow diagram shown in FIG. 8, signature enrollment, signature generation, and signature verification. For enrollment, a user may interact with a user interface to select a form to sign and provide a voice sample or other user identification. The user interface can then check if the user if voice enrolled by accessing an enrollment database with the user identification. In the case of visual signature representation, the user may be assigned a unique font for the signature or may be offered a plurality of unique fonts from which to choose via the user interface. The enrolled user can then generate a signature for the form to be signed. The user (speaker) signs the form by recording or submitting a voice sample where the voice sample audio is verified and fraud checked using, for example, a voice to text API and verification of both the voice and text files using a validation platform. The validation platform can then generate a match result (validated or not) and a token which can be provided to a visual signature generator that can create or update the visual signature with the user's selected font, the transactional contextual data, and/or the token. The visual signature generator can then save the signed form and associated metadata in a database for future access and provide the updated signature to the user/speaker for placement on the form.

Signature verification can be initiated by providing a purportedly signed form through the user interface. The signed form can be image processed and submitted to the visual signature database for verification. The stored signed document can be returned from the database for fraud check and verification with the provided form and the result can then be returned to the submitting party (e.g., a administrator seeking to validate a purportedly signed form).

Figure 9:
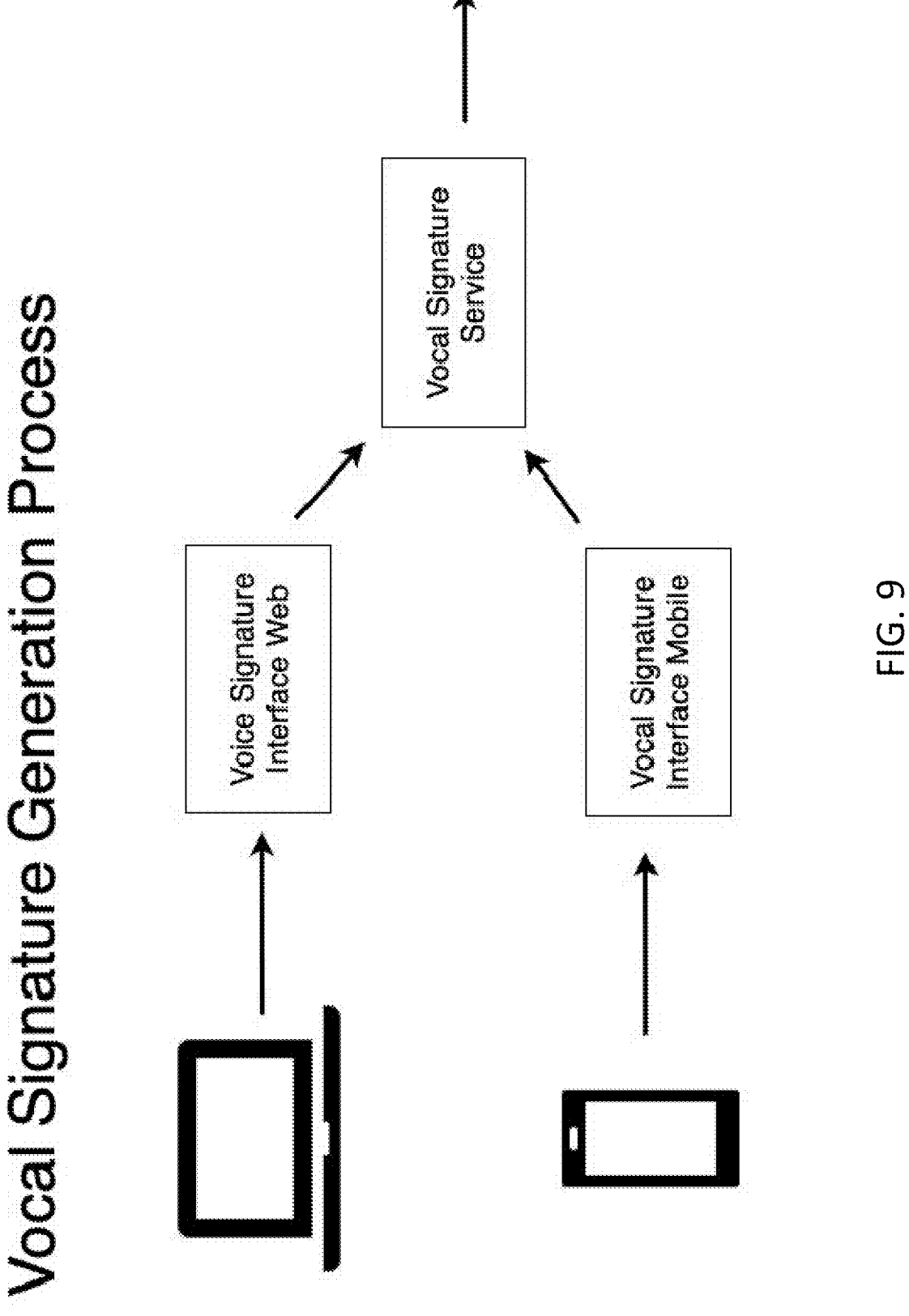
FIG. 9 diagrams a vocal signature generation process according to certain embodiments.

An exemplary vocal signature generation process is further outlined in FIG. 9. The user can initiate the process through a web-based platform or a mobile interface to access the vocal signature service. The vocal signature generation process can then include a fraud system that verifies the contract is not fraudulent followed by a voice biometric system that verifies the user's voice against stored voice information to ensure the identity of the requesting party. The vocal signature generator can then generate a vocal signature representing the specific transaction being requested. Signature generation can include font generation wherein a unique font is generated for the signature based on previous customer selections and data; waveform generation wherein a waveform is generated based on the vocal modulations of the user's vocal signature sample to uniquely represent the given signature; and signature synthesis wherein components of the signature are synthesized together to form a final signature that can be returned. The vocal signature generator can then provide the final signature along with an metadata (e.g., geolocation, ip address, time, date, or context) to be added to a read only persistence layer for storage and future access. A foreign contract store can then be updated as to the current state of the contract. Additional signatories or other parties relevant to the contract can then be automatically notified of the updated condition of the contract.

Figure 10:
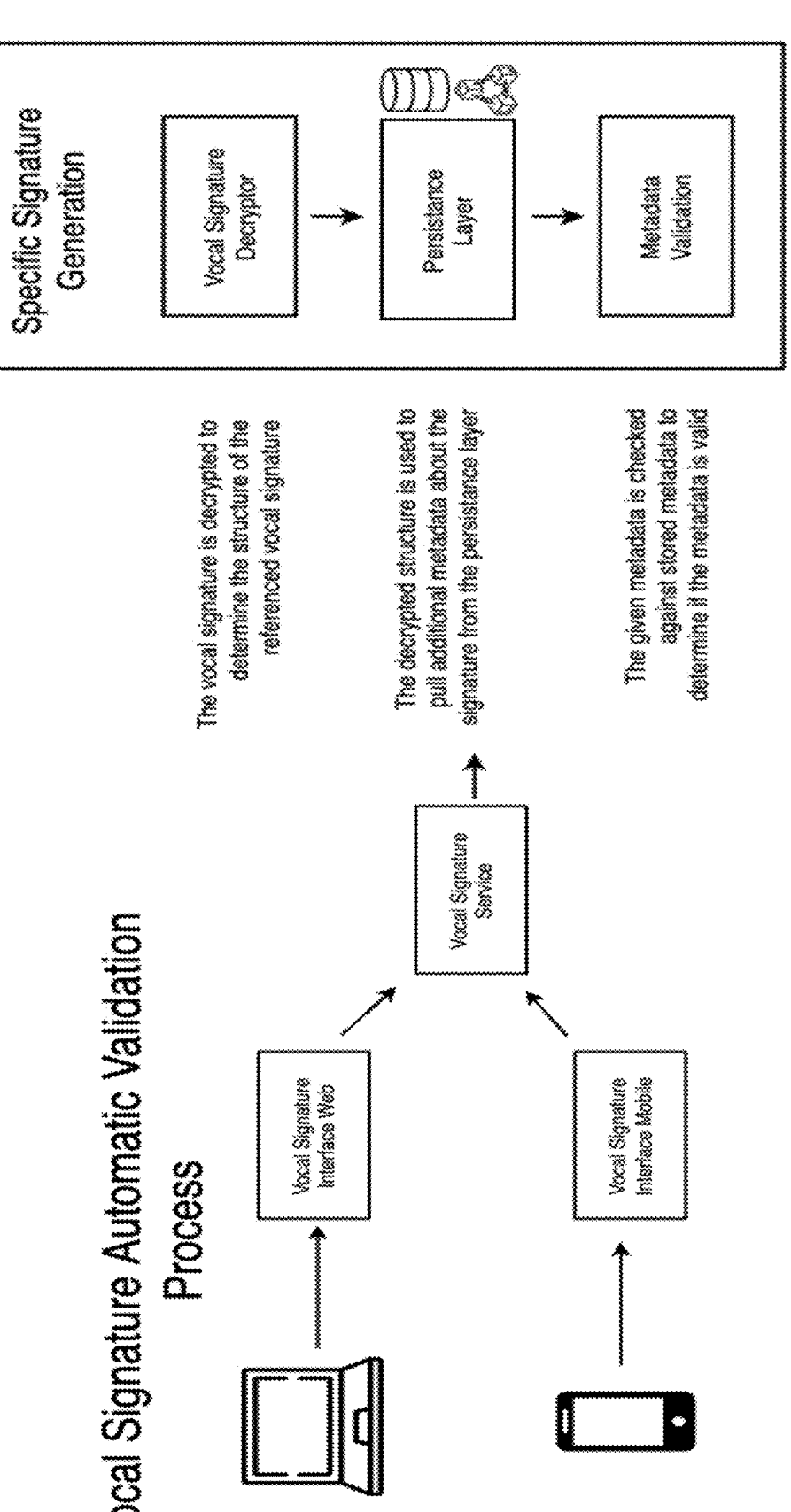
FIG. 10 diagrams a vocal signature automatic validation process according to certain embodiments.
Figure 11:
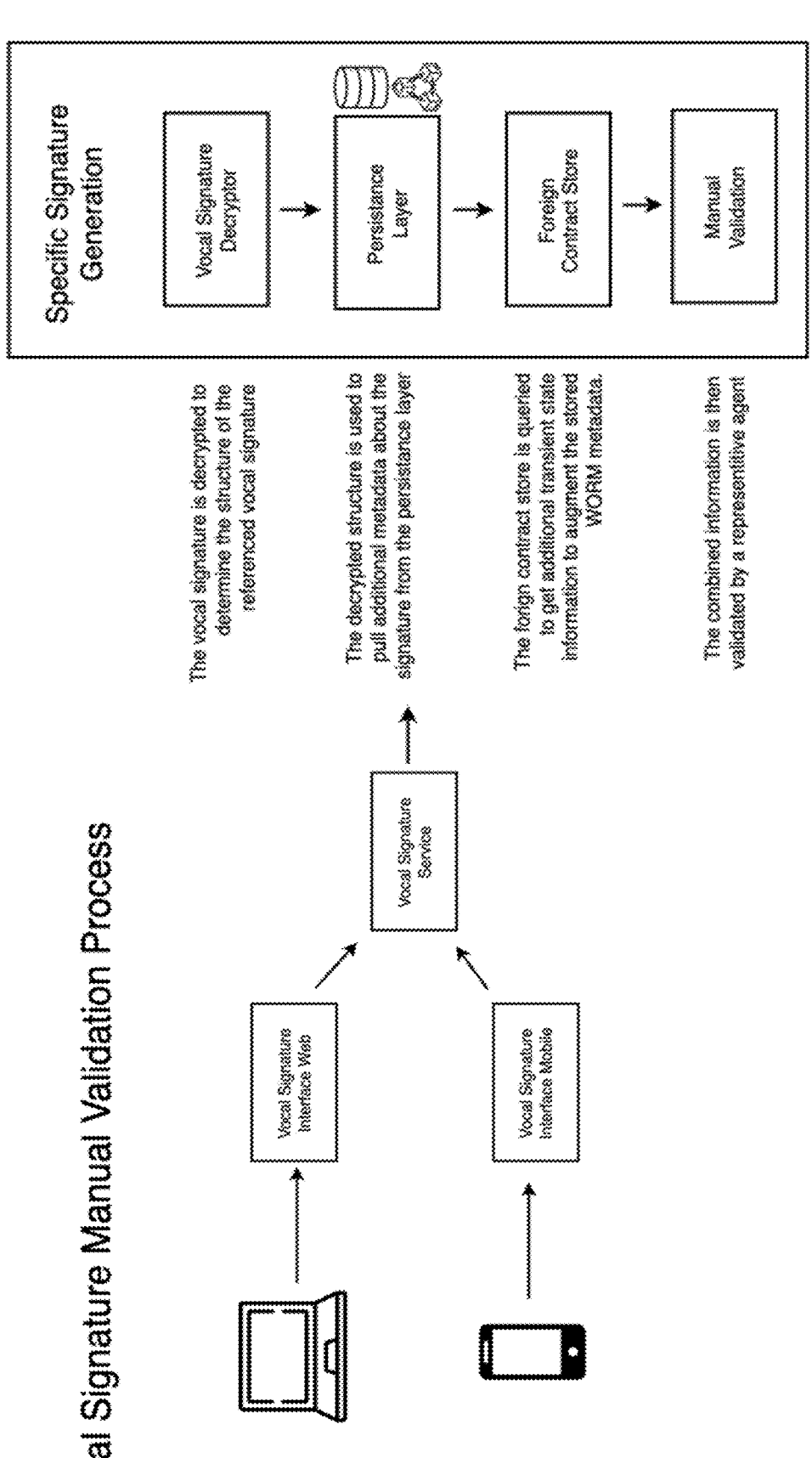
FIG. 11 diagrams a vocal signature manual validation process according to certain embodiments.

Vocal signature validation may be automatic as represented in FIG. 10, or manual as shown in FIG. 11. Automatic validation can include providing a vocal signature for validation through a web or mobile interface to the vocal signature service. The service can then decrypt the signature to determine the structure of the referenced vocal signature using a vocal signature decryptor. The decrypted structure can be used to access additional metadata related to the signature from the persistence layer where it was stored during the generation process. The metadata can then be checked against stored metadata to validate. In manual validation, once metadata is pulled from the persistence layer, the foreign contract store may be queried to get additional transient state information to augment the stored metadata. The combined transient state information and stored metadata can then be manually validated by a representative agent. In certain embodiments, automatic validation may be combined with manual validation to increase accuracy.

Figure 12:
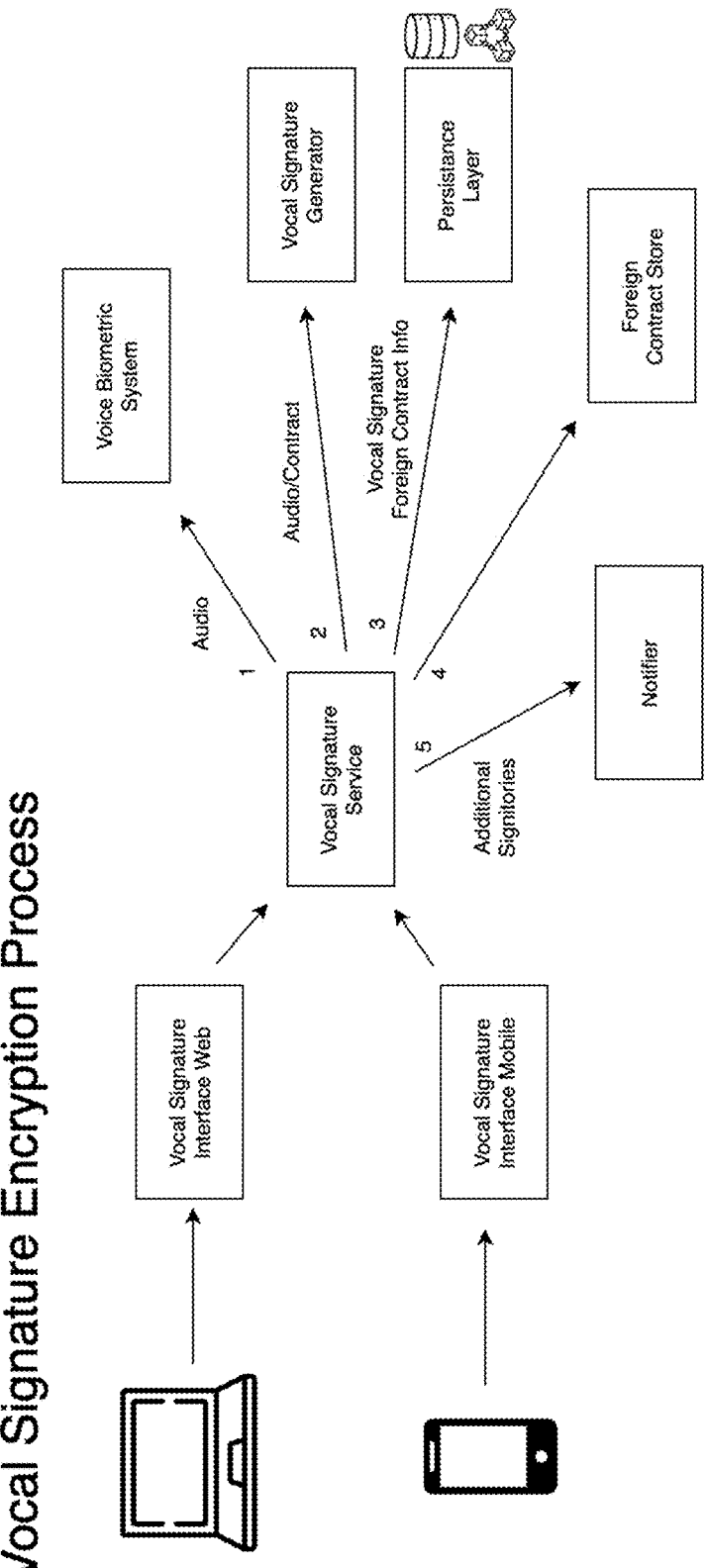
FIG. 12 diagrams a vocal signature encryption process according to certain embodiments.

An exemplary vocal signature encryption process is shown in FIG. 12. A user accesses the vocal signature service through an interface. The service can then provide audio to a voice biometric system to verify the user's voice. The audio as well as the contract to be signed can then be provided to the vocal signature generator to create a signed contract. The vocal signature and foreign contract info can then be stored in the persistence layer and the foreign contract store. Finally, additional relevant parties can be notified of the updated contract via a notifier.

Figure 13:
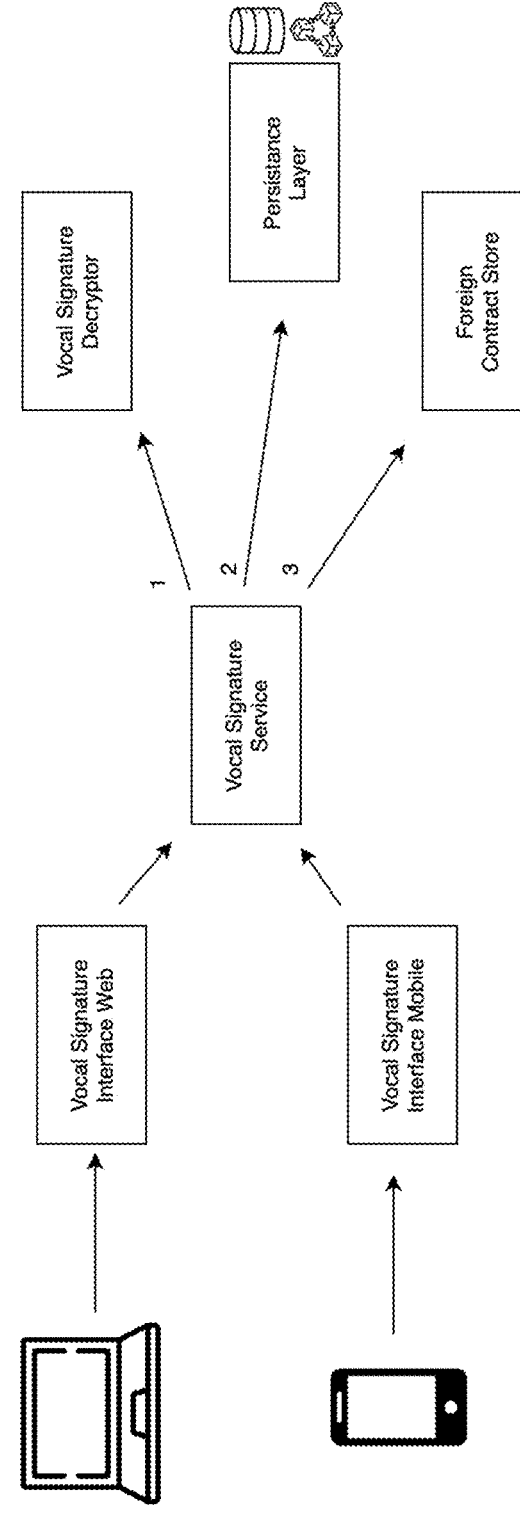
FIG. 13 diagrams a vocal signature decryption process according to certain embodiments

An exemplary vocal signature decryption process is shown in FIG. 13. A user accesses the vocal signature service through an interface with a vocally signed document. The service can then provide the document to a vocal signature decryptor to extract the metadata and other encrypted information in the signature. That information can then be used to pull the related data stored in the persistence layer and/or the foreign contract store for comparison and validation.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

14

What is claimed is:

1. A computerized method for digitally signing a digital document related to a transaction request from a customer, the computerized method comprising:

receiving, by a computing device, transaction data related to the transaction request from the customer via a web-based interface, including an account number associated with the customer, wherein receipt of the transaction data initiates a request session;

assigning, by the computing device, a tracking code upon initiation of the request session;

dynamically capturing in real-time, by the computing device, data received from the customer in the tracking code;

recording, by the computing device, during the request session a voice signature sample from the customer via the web-based user interface, wherein the voice signature includes a vocal description of the transaction request that identifies the customer, and wherein the tracking code comprises a visual waveform representation of the voice signature sample;

verifying, by the computing device, the customer for the transaction request by (i) comparing the voice signature sample with a stored voice print of the customer and (ii) comparing details about the transaction request with the vocal description of the transaction request;

generating, by the computing device, a result of the verifying step during the request session;

dynamically updating in real-time, by the computing device, the tracking code to capture the verification result, the tracking code including a token referencing the voice sample and at least a portion of the transaction data received from the customer, the token comprising one or more symbols representing a nature of the transaction positioned along the visual waveform and the position of the one or more symbols along the visual waveform encodes the portion of the transaction data;

generating, by the computing device, a consolidated record for the transaction request including the transaction data, the verification result, and the updated tracking code;

populating, by the computing device, the digital document with the transaction data if the customer is verified, including populating one or more fields requiring the customer's account number, wherein the digital document is treated as being digitally signed by the customer; and attaching, by the computing device, the tracking code to the digital document, the tracking code enabling retrieval of pertinent information related to the transaction request from the digital document, including the data received from the customer and the verification result.

2. The computerized method of claim 1, further comprising notifying the customer the result of the verifying step by displaying a confirmation code on the web-based interface.

3. The computerized method of claim 1, further comprising providing, by the computing device, instructions for what the customer should utter in the voice signature sample.

4. The computerized method of claim 1, wherein comparing the voice signature sample with the stored voice print of the customer comprises converting the voice signature sample to a text string and comparing the text string with a text representation of the stored voice print.

5. The computerized method of claim 1, wherein the tracking code comprises a Quick Response (QR) code.

6. The computerized method of claim 1, wherein the tracking code comprises a physical signature comprising the customer's name.

7. The computerized method of claim 6, wherein the customer's name in each physical signature is uniquely depicted.

8. The computerized method of claim 1, further comprising:

transmitting instructions to a second customer to initiate a next action associated with the same transaction request during the same request session;

recording a second voice signature sample from the second customer;

verifying the second customer for the same transaction request by comparing the second voice signature sample with a stored voice print of the second customer;

generating a second result of the verifying step for the second customer; and updating the consolidated record to add the second result.

9. The computerized method of claim 8, further comprising:

visually notifying the second customer the second result of the verifying step;

if the second customer is verified after the verification of the first customer, treating the digital document as being signed by both the first and second customers; and terminating the request session.

10. The computerized method of claim 8, wherein the consolidated record for the request session includes data related to both the first and second customers.

11. The computerized method of claim 1, wherein the tracking code captures a time stamp associated with the request session, and wherein signing of the digital document by the customer needs to be completed in a predetermined time period from the time stamp.

12. A computer program product, tangibly embodied in a non-transitory computer readable storage device, for digitally signing a digital document related to a transaction request from a customer, the computer program product including instructions operable to cause a computing device to:

receive data related to the transaction from the customer, including an account number associated with customer, and initiate a request session based on the receipt of the transaction data;

assign a tracking code comprising a Quick Response (QR) code upon initiation of the request session;

dynamically capture in real-time or near real time data received from the customer in the tracking code;

record, during the request session, a voice signature sample from the customer, wherein the voice signature includes a vocal description of the transaction request that identifies the customer, and wherein the tracking code comprises a visual waveform representation of the voice signature sample;

verify the customer for the transaction request by (i) comparing the voice signature sample with a stored voice print of the customer and (ii) comparing details about the transaction request with the vocal description of the transaction request;

generate a result of the verification during the request session;

dynamically update in real-time the tracking code to capture the verification result, the tracking code including a token referencing the voice sample and at least a portion of the transaction data received from the customer, the token comprising one or more symbols representing a nature of the transaction positioned along the visual waveform and the position of the one or more symbols along the visual waveform encodes the portion of the transaction data;

generate a consolidated record for the transaction request including the transaction data, the verification result and the updated tracking code;

populate the digital document with the transaction data if the customer is verified, including populate one or more fields requiring the customer's account number, wherein the digital document is treated as being digitally signed by the customer; and attach the tracking code to the digital document, the tracking coding enabling retrieval of pertinent information related to the transaction request from the digital document, including the data received from the customer and the verification result.

13. The program product of claim 12, wherein the processing system is further configured to generate a confirmation code capturing the result of the verification.

14. The program product of claim 13, wherein the web-based interface application is configured to visually display the confirmation code to the customer.

15. The program product of claim 12, further comprising instructions operable to cause the computing device to:

transmit instructions to a second customer to initiate a next action;

record a second voice signature sample from the second customer;

verify the second customer for the same transaction request by comparing the second voice signature sample with a stored voice print of the second customer;

generate a second result of the verification of the second customer during the same request session; and update the consolidated record to add the second result.

16. The computer program product of claim 15 further comprising instructions operable to cause the computing device to:

visually notify the second customer the result of the verification; and treat the digital document as being signed by both the first and second customers if both the first and second customers are verified.

17. The computer program product of claim 16, wherein the tracking code captures a time stamp associated with the request session, and wherein signing of the digital document by the first and second customers needs to be completed in a predetermined time period from the time stamp.

* * * * *